(12) United States Patent
Hasler

(10) Patent No.: US 8,863,863 B2
(45) Date of Patent: Oct. 21, 2014

(54) UNDERCUTTING TOOL

(76) Inventor: Josef Hasler, Hinterforst (CH)

( * ) Notice: Subject to any disclaimer, the term of this patent is extended or adjusted under 35 U.S.C. 154(b) by 261 days.

(21) Appl. No.: 13/324,070

(22) Filed: Dec. 13, 2011

(65) Prior Publication Data

US 2012/0148357 A1 Jun. 14, 2012

(30) Foreign Application Priority Data

Dec. 13, 2010 (EP) .................................. 10194704

(51) Int. Cl.
*B23B 29/034* (2006.01)
*B23B 51/00* (2006.01)

(52) U.S. Cl.
CPC .................................. *B23B 51/0045* (2013.01)
USPC ........... 175/266; 175/202; 175/263; 175/284; 175/289; 175/291; 175/265; 175/288

(58) Field of Classification Search
CPC ............ B23B 29/034; B23B 29/03453; B23B 29/03496; E21B 10/32; E21B 47/28; E21B 47/281; E21B 49/00; E21B 49/02; E21B 49/27; E21B 49/03446; E21B 51/00
USPC ......... 175/202, 263, 266, 284, 289, 291, 265, 175/288; 166/216, 217, 382; 82/1.2–1.5, 82/82; 408/146–186
See application file for complete search history.

(56) References Cited

U.S. PATENT DOCUMENTS 197,075 A * 11/1877 Albright ........................ 175/289
2,247,283 A 6/1941 Young
6,761,233 B1 * 7/2004 Aadland ......................... 175/97

FOREIGN PATENT DOCUMENTS

DE 29 28 555 A1 1/1981
DE 196 09 798 A1 9/1997

* cited by examiner

*Primary Examiner* — Jennifer H Gay
*Assistant Examiner* — George Gray
(74) *Attorney, Agent, or Firm* — Muncy, Geissler, Olds & Lowe, P.C.

(57) ABSTRACT

An undercutting tool for producing transverse grooves in a drilled hole. An upper support and a lower support axially delimit a receiving region of a shank. At least two spreading elements are disposed in the receiving region between the spreading elements and the receiving region. The shank and the supports are disposed so the axial distance between the supports can be reduced by exerting an axial force. The spreading elements each have an oblique upper and lower end face, which each have such an outer geometric shape, extending in a direction not perpendicular to the longitudinal axis and are displaced in substantially opposite radial directions, and the axial force is in each case converted to a radial force in the radial directions.

12 Claims, 6 Drawing Sheets

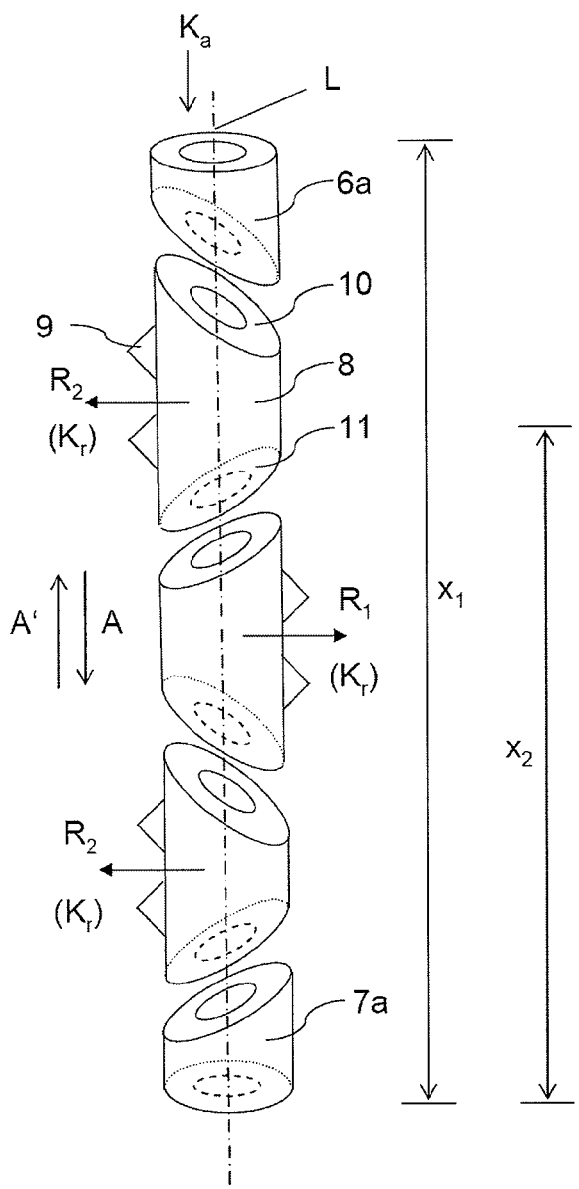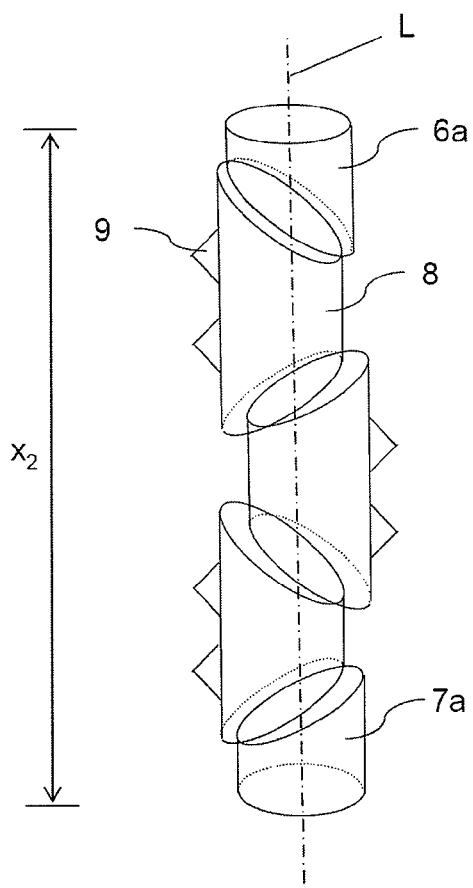
Fig. 2a  Fig. 2b

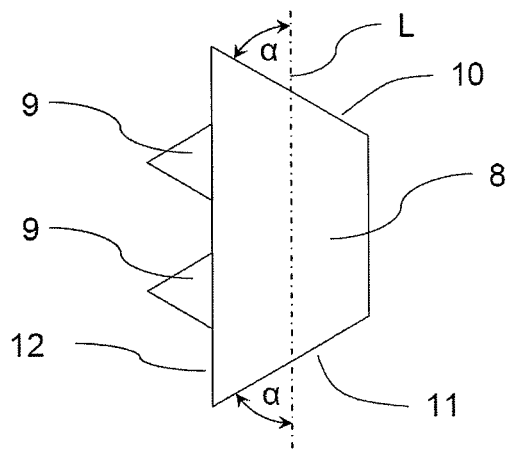
Fig. 2c
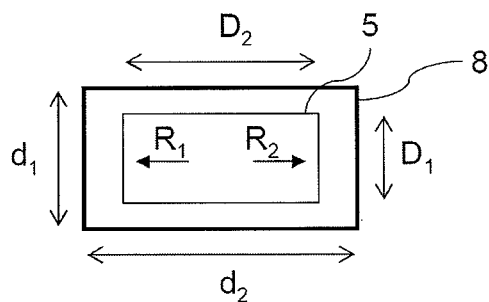 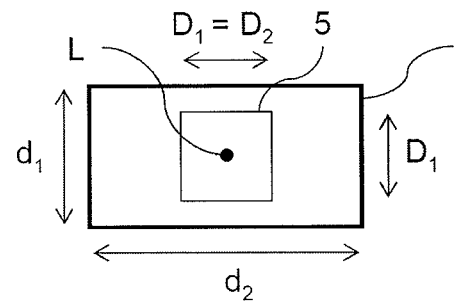
Fig. 3a   Fig. 3b
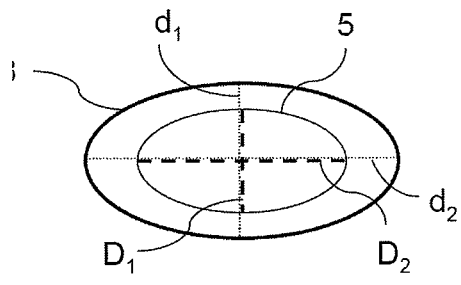 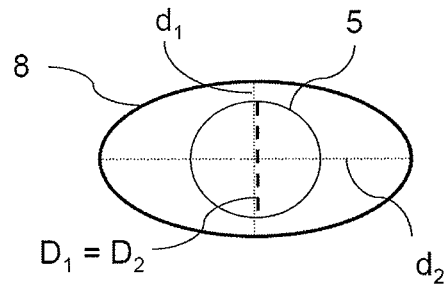
Fig. 3c   Fig. 3d

UNDERCUTTING TOOL

CLAIM OF PRIORITY

This application claims priority to European Patent Application No.:10194704.2, which was filed in the EPO on Dec. 13, 2010, and which is herein incorporated by reference in its' entirety.

FIELD OF DISCLOSURE

The invention relates to an undercutting tool for producing transverse grooves in a drilled hole.

BACKGROUND

In the field of construction engineering, it is known from the prior art that cylindrical holes, in particular blind holes, having a typical diameter of 10 mm to over 25 mm, are drilled in concrete or stone by means of conventional drills, in particular concrete drills, and dowels, reinforcing irons and concrete anchors etc. are anchored in these holes by means of hardening substances, in particular adhesive agents. A problem in the prior art consists in that the inner surfaces of a hole drilled in concrete or stone is comparatively smooth, and the adhesive agents, e.g. adhesive, liquid concrete, etc. does not have an adequate hold, or does not have a sufficiently large interaction surface, on such a smooth inner surface of a drilled hole. This results inherently in a potential lack of robustness, in particular in respect of axial tensile forces.

In order to improve the hold of components, such as support elements, hooks, reinforcements and the like, that are to be adhesive-bonded, for example, in drilled holes and, in particular, in order that they can be inserted with improved robustness against axial tensile forces, it is therefore necessary to enlarge the interaction surface between the hole wall and the adhesive agent. This can be effected by roughening the surface, and in particular by producing transverse grooves in a drilled hole.

Undercutting tools that convert an axial force to a radial force by means of a spreading mechanism are known from the prior art, for the purpose of producing transverse grooves in a previously created drilled hole. Cutting elements are pressed radially against the wall of the drilled hole by the radial force, such that, upon rotation, transverse grooves, or undercuts, can be produced in the wall of the drilled hole.

There are known in this case, firstly, solutions in which an undercutting tool is supported at the end of a blind hole, i.e. on the bottom of the hole, for the purpose of defining a working position, as well as, secondly, solutions in which the undercutting tool is supported on the surface surrounding the hole to be worked.

A solution of the first type is disclosed, for example, in DE 196 09 798. The drilling tool described therein comprises a cylindrical receiving body having a non-round guide channel, passage openings that are open radially outward, two cutting elements that can be displaced outward radially through these passage openings, and a slide having a non-round cross-section. The slide projects at least partially into the guide channel of the receiving body, goes through through-bores of the cutting elements, is displaceable, against the force of a spring, against the direction of drilling, and serves to displace the cutting elements radially. A plurality of successively disposed guide regions of the slide have a guide edge, stop edges, and slide surfaces that taper against the direction of drilling, as well as slide surfaces that widen against the direction of drilling, the cutting elements being able to slide along such slide surfaces. The slide is supported on a base of a drilled blind hole.

When the receiving body is displaced in the drilling direction relative to the slide support at the end of the blind hole, sliding of cutting elements along a slide surface results in the cutting element being displaced radially out of an initial position, in which the cutting elements do not project over the outer contour of the receiving body, into a working position, which projects over the outer contour of the receiving body and in which rotation of the tool causes transverse grooves to be cut into the drilled hole.

The drilling tool according to DE 196 09 798 is thus based on converting an axial force to a radial force, the slide, having a non-round cross-section, having the function of a spreading element. However, the manner in which the slide and the cutting elements are made to act together is disadvantageous in several respects: on the one hand, owing to the through-bores of the cutting elements, the cutting elements have a certain amount of play for the slide. This play can easily lead to the cutting elements becoming caught on the wall of a drilled hole, as a result deviating from the intended, precisely radial alignment when subjected to load. On the other hand, when the cutting elements are being guided back after the axially acting force has been removed, damage can occur, for example axially extending cutting or grinding marks in the drilled hole, as a result of a merely slow-acting return movements. In addition, the described conversion of axial force to radial force is relative inefficient, since the slide surfaces taper or widen gradually in the direction of drilling, but extend virtually parallel to the direction of drilling over larger regions in which, although the action of centrifugal force does cause the cutting elements to be moved radially, axial force is nevertheless not actively converted to radial force. Since the cutting elements are designed with through openings for the slide, they also have a relatively low level of robustness, such that they can easily break when subjected to load.

A technical solution of the second type, i.e. with the undercutting tool being supported on the surface surrounding the drilled hole to be worked, is disclosed in DE 29 28 555. This document describes an undercutting tool having cutting elements that can be displaced in the radial direction, by means of an axially displaceable spreading element, by axial force upon a rotatable tool shank. The spreading element is realized as a spindle having thrust surfaces realized so as to run obliquely in the axial direction. The cutting elements have oblique surfaces, running in the axial direction, which can slide along the thrust surfaces of the spindle-type spreading element. The axially movable spreading element is surrounded by a drilling sleeve, which is immovable in the axial direction and which, in the region of the cutting elements, has recesses, or openings, in which the cutting elements are held substantially without axial play, but so as to be movable in the radial direction.

The cutting elements, which, with their oblique surfaces, slide along the thrust surfaces of the spreading element, and which have outwardly facing cutting edges, are driven radially outward as a result of movement of the spindle-type spreading element in the axial direction, such that, when in the driven-out state, they can then produce an undercut in the drilled hole.

This solution also has various disadvantages, which are likewise caused by the functionality of spreading element and cutting element being split into two discrete components. Both the spindle-type spreading element and the cutting elements, which, with their axially aligned oblique surfaces, can slide on the thrust surfaces of the spreading element, are subject to a high degree of mechanical stress, since this type of interaction results in an axial force being only incompletely converted to a radial force and being converted, to a considerable extent, to a frictional force between these surfaces. In addition, in this case likewise, when the cutting elements are being guided back, by drawing the spreading element back axially; inertia or a slight tilting can result in damage to the tool or to the wall of the drilled hole to be worked.

What the known solutions of the prior art have in common is that the axially distributed cutting elements cannot move radially independently of one another. If the radial mobility of one cutting element is blocked, for example because the wall of the drilled hole is harder in one region than in another region—in particular because of a reinforcement iron or a discontinuity in the material in the wall of the drilled hole, in the case of the solutions of the prior art the radial mobility of the remaining cutting elements, which are not blocked per se, is also prevented.

The object of the present invention is to provide an improved undercutting tool, by which the described technical disadvantages of known tools of the generic type can be avoided. A constituent object consists in a more efficient conversion of axial force to radial force. A further constituent object is to prevent the cutting elements from becoming caught on the wall of the drilled hole. A further constituent object is constituted by rapidly and faultlessly guiding the cutting elements back out of their working position into their neutral position when the acting axial force ceases. A further constituent object consists in that the separating elements are able to separate independently of one another, and in that the radial blocking of one cutting element, for example caused by a reinforcement iron projecting into the drilled hole, does not result in the rest of the cutting elements being impeded in their cutting function. In addition, according to a further constituent object, the undercutting tool is to be such that servicing is made easier and worn cutting elements can be replaced in a rapid and simple manner when required.

SUMMARY

These objects are achieved by the subject-matter of the independent claim. Features that develop the invention in an alternative or advantageous manner are given by the dependent claims.

The undercutting tool according to the invention serves, in particular, to produce transverse grooves in a drilled hole, the transverse grooves at least partially constituting undercuts in the drilled hole and thus constituting an engagement surface for elements to be anchored in the drilled hole. As a ratio of the diameter of the drilled hole, the transverse grooves can have a small cross-section, of less than one twentieth, or a large cross-section, of more than one fifth. The grooves can thus constitute merely a roughening, or they can constitute substantial undercuts.

The undercutting tool has a geometric longitudinal axis that extends centrally along an oblong, in particular substantially cylindrical tool. This geometric axis defines two mutually opposite directions, namely, an axial direction and an axial direction that is the inverse of this axial direction, and which in the following is referred to as the "inverse axial direction". As viewed from the axial center point of the undercutting tool, the axial direction faces toward the lower end of the tool, and the inverse axial direction faces toward the upper end of the tool. The terms "bottom" and "top" are thus to be understood to refer, not to an absolute position related to the gravitational field of the earth, but to the relative position along the geometric longitudinal axis, a portion being located relative to an upper portion in the axial direction. The direction from top to bottom is thus the axial direction, and the direction from bottom to top is the inverse axial direction, irrespective of the absolute position of the undercutting tool in the gravitational field.

The undercutting tool has a shank, having an upper shank end that faces in the inverse axial direction, and having a lower shank end that faces in the axial direction. The shank can be realized as a single piece or in multiple pieces. The shank is to be understood, generally, as an oblong body extending along the geometric longitudinal axis. In a special embodiment, the shank can be of a substantially cylindrical shape.

The upper shank end can be connected in a rotationally fixed manner to a rotary drive machine, in particular a power drill, in order to make the shank rotate about the longitudinal axis. The upper shank end, in general, is of a shape suitable for clamping into a rotary drive machine, in particular into a drill chuck, an insert chuck, for example an SDS chuck, or a jaw chuck. Preferably, the upper shank end has a substantially cylindrical cross-section, possibly with at least one axial groove and/or a flattened portion to prevent slip when in the clamped state. The upper shank end is to be understood, in general, as being an upper portion of the shank.

Located between the upper shank end and the lower shank end there is a receiving region of the shank, intended to receive spreading elements. This receiving region is delimited, axially in each case, by an upper support of the undercutting tool and by a lower support of the undercutting tool. As viewed from the inside of the receiving region outward, the upper support delimits the receiving region in the inverse axial direction, while the lower support, which is spaced apart axially from the upper support, delimits the receiving region in the axial direction. In a special embodiment, the lower support is disposed at the lower shank end or close to the lower shank end.

At least two spreading elements, realized as sleeve-type hollow bodies, are disposed in an axially distributed manner in the receiving region, and each encompass the shank in the receiving region. In each case, between the spreading elements and the receiving region of the shank, there is a radial play in a respective radial direction, perpendicularly in relation to the longitudinal axis. In other words, the inner cross-section of the spreading element realized as sleeve-type hollow bodies is larger, at least in a radial direction, than the corresponding outer cross-section of the receiving region, such that in each case there is a radial play in respectively one radial direction, which runs perpendicularly in relation to the longitudinal axis. The spreading elements each have at least one cutting tooth, facing substantially outward in that radial direction along which the respective spreading element has the radial play. The respective at least one cutting tooth is preferably made of hard material, in particular of hard metal, high-speed steel, ceramic, sapphire or diamond. Either the respective cutting tooth is coupled to the respective spreading element, or the cutting tooth and the spreading element are realized so as to constitute a single piece, in which case, preferably, both are composed of the same material, preferably a hard metal.

According to the invention, the shank is realized in such a way, and the upper support and the lower support are disposed in such a way that the axial distance between the upper support and the lower support can be reduced, by exerting an axial force, directed in the axial direction, upon the upper shank end, in particular in a resilient manner. In other words, the undercutting tool is realized in such a way that the axial distance between the upper support and the lower support is variable, this distance being reduced by exerting a downwardly directed force upon the upper shank end, which force, in particular, but not necessarily, opposes a spring force. The force opposing the axial force upon the upper shank end can be applied by supporting the undercutting tool on the bottom, or on the end, of the blind hole, or on the surface surrounding the hole to be worked. Depending on the nature of the support, there are various possibilities for making the axial distance between the supports variable in dependence on the axial force. Thus, it is possible, for example, to couple the lower support to a lower end of the undercutting tool, for example to the lower shank end or to a lower bottom element, and to couple the upper support to the upper shank end, creating an axial resilience between the upper and the lower support. This axial resilience can be achieved, for example, through a telescopic arrangement or through elastic deformability, for example of the shank. Possible arrangements are described more precisely in the following.

The spreading elements are disposed in an axially displaceable manner, in the axial extent region between the upper support and the lower support, in the receiving region. The spreading elements are rotationally coupled to the upper shank end. In other words, as a result of the upper shank end being made to rotate, the spreading elements likewise can be made to rotate substantially about the longitudinal axis. For this purpose they are disposed so as to be secured against rotation in the receiving region. This securing against rotation can be realized, for example, firstly; in that there is a direct rotatory coupling between the spreading elements and the receiving region of the shank, which, in turn, is coupled to the upper shank end in a rotatory manner. This rotatory coupling can be achieved by means of a form closure, in that the inner cross-section of the spreading elements and the outer cross-section of the receiving region engage in one another in such a way that the spreading elements are seated on the receiving region such that they are secured against rotation. Secondly, there is the possibility of coupling the spreading elements to the upper support and/or to the lower support in a rotatory manner, the upper support or the lower support being in turn coupled in a rotatory manner to the upper shank end, which can be driven by the drive machine. This rotatory coupling can be effected, in particular, via oblique end faces of the spreading elements and of the upper and/or lower support.

The terms secured against rotation and coupled in a rotatory manner are to be understood to mean, in general, that no given multiple, relative rotation between two elements is possible in an unlimited manner. Optionally, this securing against rotation, or rotatory coupling, can exist only in one direction of rotation, namely, in the direction of rotation of the drive machine. The terms secured against rotation and coupled in a rotatory manner do not necessarily refer to a rotationally rigid coupling, since a rotational play and/or a slip are possible, as long as the drive machine is able to cause the corresponding element to rotate, possibly after a multiplicity of rotations and possibly with slip.

The axial displaceability of the spreading elements within the receiving region of the shank is limited by the upper support in the inverse axial direction and by the lower support in the axial direction. Reducing the distance between the supports causes the spreading elements to be compressed. In other words, the axial spacing of the spreading elements relative to one another is reduced. The axial displaceability of the spreading elements thus serves, in particular, to enable the axial spacing of the spreading elements relative to one another to be reduced as the distance between the supports is reduced, thereby enabling the spreading elements to be offset in one another.

The at least two spreading elements each have both an oblique upper end face and an oblique lower end face. The oblique upper end face faces upward, i.e. in the inverse axial direction, whereas the oblique lower end face faces downward, i.e. in the axial direction. The term oblique end face is to be understood, in general, as being a surface of a spreading element that extends non-perpendicularly and non-parallelwise in relation to the longitudinal axis. In other words, an oblique end face is in each case intersected by a geometric longitudinal plane, on which the longitudinal axis lies and which runs parallelwise in relation to the respective radial direction, in a line of intersection that is not perpendicular to the longitudinal axis and intersects the longitudinal axis with an angle of intersection whose angular amount is less than 90° but greater than 0°. The respective end face runs straight in a direction parallel to this respective line of intersection, such that two corresponding end faces lying on one another are able to slide along this respective line of intersection. The end faces thus extend in a direction that is not perpendicular to the longitudinal axis. In a special embodiment, each end face additionally runs in a direction perpendicular to the longitudinal plane, such that each end face runs on one geometric plane in each case. In another embodiment, the respective end face is waved or stepped, the waving or stepping extending in a direction perpendicular to the longitudinal plane.

In a particular embodiment of the invention, the spreading elements are realized as cylinders cut off obliquely on both sides, namely, hollow cylinders, in particular having a circular, oval or polygonal outer cross-section, or a combination thereof. The respective upper end face and the respective lower end face in this case are beveled, in respect of the geometric longitudinal axis, in substantially opposite directions in relation to one another. The spreading elements have substantially a trapezoidal shape in a geometric longitudinal section along the longitudinal axis, in particular in the above-mentioned longitudinal plane, and along a radial direction, the respectively at least one cutting tooth being disposed on the broad base of the trapezium. The broad base of the trapezium is to be understood as being the larger of the two outwardly facing sides of the trapezium, which are preferably parallel to the longitudinal axis. In other words, the upper and the lower end edge of a spreading element are preferably each beveled by the same angular amount, but in opposite directions in respect of the geometric longitudinal axis, such that opposing end edges of spreading elements disposed in axial succession constitute mutually contacting slide surfaces that are displaceable against each other. This has the advantage that the conversion from axial force to radial force, and also conversely, in the case of decompression upon cessation of the action of an axial force, is effected uniformly for spreading elements disposed in axial succession.

In a development of the invention, the geometric shape of the oblique end faces is such in each case that the upper end face and the lower end face are each beveled by the same angular amount, but in mutually opposite directions, in respect of the geometric longitudinal axis. This is to be understood as follows. The two oblique end faces are each intersected by a geometric longitudinal plane, on which the longitudinal axis lies and which runs parallel to the respective radial direction, in a line of intersection in each case that is not perpendicular to the longitudinal axis. The two lines of intersection each intersect the longitudinal axis with the same, but opposing, angle of intersection, whose equal angular amount is less than 90° but greater than 0°.

The efficiency of the conversion from axial force to radial force and vice versa can be increased yet further through optimized selection of the bevel. In a special embodiment, the angular amount of the angle of intersection between one end face or both end faces and the longitudinal axis geometrically piercing the respective end face is between 10° and 80°, in particular between 45° and 80°, in particular between 60° and 75°, in particular between 66° and 70°. An angular amount of 0° would mean an end face directed parallelwise in relation to the longitudinal axis, whereas an angular amount of 90° means an end face directed perpendicularly in relation to the longitudinal axis.

The oblique end faces of the spreading elements thus have such an outer geometric shape, extending in a direction not perpendicular to the longitudinal axis, that, as a result of the axial distance between the upper support and the lower support being reduced, respectively adjacent spreading elements are displaced in radial directions that are substantially opposite. In other words, two adjacent spreading elements are displaced relative to one another in opposing radial directions, along the end faces that act as slide surfaces, namely a lower and an upper end face in each case. In addition, they are also displaced relative to one another in the axial direction, as a result of being pushed together. Respectively opposite upper and lower end faces of spreading elements disposed in axial succession constitute mutually contacting slide surfaces that can be displaced against one another.

According to the invention, it is possible for the upper and/or lower support likewise to have beveled end faces, which correspond to the end faces of the spreading elements. Alternatively, it is possible likewise for radially movable or radially immovable closure elements to be disposed between the uppermost spreading element and the upper support, and between the lowermost spreading element and the lower support, these closure elements also being able to have a cutting tooth if necessary, and being beveled on the respectively inner end face, corresponding to the spreading elements, and on the respectively outer end face being of a shape that corresponds to the respective support. Alternatively, the closure elements are firmly connected to the supports or realized so as to constitute a single piece therewith.

The radial play, described above, of each spreading element in the respective radial direction, and the end faces extending obliquely in relation to this respective radial direction thus have the effect that, by means of the radial play, an axial force directed onto the upper shank end in the axial direction, and a corresponding axial movement is converted to a radial force in each of the radial directions, or into a corresponding radial movement.

An undercutting tool according to the invention realized as described has a multiplicity of advantages as compared with the prior art. The functionalities of cutting element and spreading element are combined in a single component, thereby reducing the components that are potentially subject to wear. The conversion of axial force to radial force is more efficient, since the one component does not necessarily remain stationary in a radial direction while only the other interacting component, disposed in a complementary manner, is displaced radially but, rather, the respectively two components that are movable relative to one another are preferably both displaced radially, in substantially opposite directions. In addition, upon cessation of the axially acting force, which acts to compress the distance between an upper and a lower support and the spreading elements disposed between them, the spreading elements are again decompressed.

Additionally, an essential advantage of the undercutting tool according to the invention consists in that, in the event of the radial mobility of a single cutting element or a plurality of cutting elements becoming blocked, the radial mobility of the remaining cutting elements is not impeded. If, for example, the drilled hole has an excessively hard wall in one region, in particular because of reinforcement irons projecting into the wall or because of an irregularity in the material of the wall, and if it is not possible for the cutting element to cut into this hard wall portion, this blocking of the radial expansion capability of the affected cutting element does not affect the remaining cutting elements. These remaining cutting elements can perform their cutting function in an unimpeded manner, since the radially blocked cutting element transfers the axial force to the remaining cutting elements.

Particular geometric embodiments of the spreading elements and cross-sectional geometries of the lower shank portion surrounded by the latter can further enhance these advantageous effects.

The relative cross-sectional geometries (perpendicular to the axial direction) of the outer diameter of the receiving region and of the inner diameter of the sleeve-type spreading elements—surrounding the latter—can also contribute substantially to efficient conversion between axial and radial force and good radial displaceability of the spreading elements.

In one development, the receiving region surrounded by the sleeve-type spreading elements has an outer cross-section having a first outer diameter perpendicular to the longitudinal axis and having a second outer diameter perpendicular to the longitudinal axis and perpendicular to the first outer diameter. An outer diameter is to be understood, in general, as being the outer dimension in the direction of an axis perpendicular to the longitudinal axis. It can also be the outer dimension of a square, rectangular, polygonal, circular or elliptical body. Accordingly, the receiving region has, in particular, a square, rectangular, polygonal, circular or elliptical cross-section, the longitudinal axis being, in particular, a geometric normal of the cross-sectional plane. The spreading elements each have an inner cross-section that, while providing for the above-mentioned play, corresponds to the outer cross-section of the receiving region. The inner cross-section has a first inner diameter that runs perpendicularly in relation to the longitudinal axis, and has a second inner diameter that extends both perpendicularly in relation to the longitudinal axis and perpendicularly in relation to the first inner diameter. An inner diameter is to be understood, in general, as being the inner dimension in the direction of an axis perpendicular to the longitudinal axis. The inner cross-section of the spreading elements is, in particular, square, rectangular, polygonal, circular or elliptical, the longitudinal axis being, in particular, a geometric normal of the cross-sectional plane of the inner cross-section. Preferably, the first inner diameter of the respective spreading element is larger—in particular, slightly larger—than the first outer diameter of the receiving region, such that it is possible for the spreading elements to be displaced axially, at least partially, along the longitudinal axis in the receiving region. By contrast, the second inner diameter of the respective spreading element is substantially larger than the second outer diameter of the receiving region, such that said radial play is formed in the respective radial direction, perpendicularly in relation to the longitudinal axis, such that the spreading elements can be displaced radially.

In other words, in a development of the invention, the receiving region of an undercutting tool according to the invention that is surrounded by sleeve-type spreading elements has an outer cross-section having at least one outer diameter—corresponding to the outer cross-section main axis or to the outer cross-section diagonals—perpendicularly in relation to the geometric longitudinal axis. The spreading elements each have an inner cross-section having two inner diameters—corresponding to inner cross-section main axes or inner cross-section diagonals—preferably of differing lengths, along the inner cross-section main axes or inner cross-section diagonals, perpendicularly in relation to the geometric longitudinal axis. At least one of the inner diameters of the spreading elements in this case is larger than the at least one outer diameter of the receiving region. This enables the spreading elements to be displaced radially. Preferably in this case, the inner cross-section of the spreading elements is elliptical or rectangular. In an advantageous development, the receiving region surrounded by the spreading elements has an elliptical, preferably circular, or a rectangular, preferably square, outer cross-section, perpendicularly in relation to the geometric longitudinal axis.

In a special embodiment, the lower support is connected in an axially fixed manner to the lower shank end, in particular by means of a screw screwed into the lower shank end. The lower support is disposed, for example, at the lower shank end, and can be pushed off in the axial direction. The spreading elements are pushed onto the receiving region and are removable from the latter, and are secured by the detachable lower support against falling down from the receiving region in the axial direction. Preferably, the undercutting tool according to the invention is thus configured such that the spreading elements can be pushed, as onto a chain cord, onto the receiving region or can be removed from the latter, and are secured by a fastening mechanism against falling down from the receiving region. Such an arrangement makes it easy to service and clean the tool, for example to clean spreading elements whose cutting teeth have become worn.

In a preferred embodiment, the undercutting tool comprises a first movement portion and a second movement portion. The upper shank end and the upper support are assigned to the first movement portion, whereas the lower support is assigned to the second movement portion. The first movement portion and the second movement portion are axially displaceable in relation to one another for the purpose of varying the axial distance between the upper support and the lower support. The second movement portion, to which the lower support is assigned, can be coupled axially to the drilled hole in the axial direction, in that, for example, in a first variant, it can be supported on the bottom of the drilled hole or, in a second variant, on a surface surrounding the drilled hole.

In the case of this said first variant, in a possible development of the invention the upper support is coupled axially to the shank, and the shank is assigned to the first movement portion. The lower support is coupled axially to a lower support sleeve, or is constituted by the lower support sleeve. This lower support sleeve is disposed at the lower shank end, is assigned to the second movement portion, and can be supported on the bottom of the drilled hole. The lower shank end can be pushed into the support sleeve in the axial direction in such a way that the axial distance between the upper support and the lower support can be reduced by exerting the axial force upon the upper shank end and pushing the lower shank end into the lower support that radially surrounds the shank and, into the support sleeve. An advantage of this first variant consists in the relatively simple structure of the undercutting tool, which is composed of only few components and is very easy to service. Since the lower support sleeve is supported on the bottom of the drilled hole, the drilled hole nevertheless does not have to be a blind hole having a bottom, or be of a length that does not substantially exceed the length of the undercutting tool. In addition, the lower portion of the drilled hole, in which the lower support sleeve is located, does not become roughened by means of the spreading elements and their cutting teeth. These limitations, which are possibly disadvantageous in a number of applications, are eliminated by the second variant.

In the case of said second variant, in a possible development of the invention the shank is composed of an upper shank portion and a lower shank portion. The upper shank portion and the lower shank portion can be pushed into one another, in particular in a telescopic manner, along the longitudinal axis. The upper shank portion, which comprises the upper shank end and the upper support, in this case constitutes the first movement portion, whereas the lower shank portion, which comprises the lower shank end and the lower support, constitutes the second movement portion. Preferably, the lower shank portion is coupled axially to a support shoulder, which is assigned to the second movement portion. This support shoulder, in a region above the upper support, surrounds the lower shank portion radially in such a way that the second movement portion, by means of the support shoulder, can be supported on a surface surrounding the drilled hole, in order to prevent the second movement portion from being displaced in the axial direction. The support shoulder can be mounted radially on the shank, in particular by means of a rolling or plain bearing, such that the support shoulder can lie in a stationary manner on the surface that surrounds the drilled hole. This has the advantage that there is no relative movement between the surface and the support shoulder lying thereon. Alternatively the support shoulder is coupled to the shank in a rotatory manner, such that the support shoulder rotates. This is disadvantageous to a greater or lesser extent, depending on the coefficient of friction of the surface.

In other words, in the case of this second variant, the extent to which the undercutting tool can be pushed into the drilled hole is delimited axially by the support shoulder, the support shoulder, when the shank has been pushed fully into the drilled hole, lying on the surface that radially surrounds the drilled hole, and thereby preventing the second movement portion from being pushed further into the drilled hole. The second movement portion is thus fixed axially in the axial direction, while the first movement portion can be pushed further into the drilled hole in the axial direction for the purpose of reducing the distance between the upper and the lower support and thus compressing the spreading elements.

In the case of this second variant, the lower shank end, the lower support, the receiving region assigned to the second movement portion, with the spreading elements surrounding the receiving region and, in particular, the upper support can be inserted into the drilled hole. The upper shank portion has a pin, which extends along the longitudinal axis and goes through the support shoulder in an axially displaceable manner for the purpose of axially coupling the upper shank end to the upper support, and which is assigned to the first movement portion. The spreading elements are coupled to the upper shank end in a rotation-transferring manner, such that a rotation of the upper shank end is transferred to the spreading elements. Preferably, the lower shank portion is realized so as to be hollow, at least in the region of the support shoulder, along the geometric longitudinal axis, the pin being guided so as to be axially displaceable inside the lower shank portion. This pin is coupled to the upper support via a slot in the lower shank portion and, in particular, by means of a transverse bolt, which connects the pin to the upper support.

This second variant has the advantage that the undercutting tool can be used for any drilled hole whose depth corresponds at least to the maximum longitudinal extent between the support shoulder and the lower end of the undercutting tool, i.e. even for very deep drilled holes or though-bores. The cutting teeth of the spreading elements can extend as far as the end of the tool, such that the lower region of a drilled hole can also be roughened.

BRIEF DESCRIPTION OF THE DRAWINGS

The undercutting tool according to the invention is described more fully in the following, purely as an example, with reference to exemplary embodiments represented schematically in the drawings, wherein, in particular:

FIG. 2a shows a schematic arrangement of spreading elements in a non-compressed initial position;

FIG. 2b shows a schematic arrangement of spreading elements in a compressed position;

FIG. 2c shows a schematic longitudinal sectional representation of a spreading element;

FIG. 3a shows an inner contour of a spreading element and an outer contour of a receiving region, each having a rectangular cross-section and a radial play in a radial direction;

FIG. 3b shows an inner contour of a spreading element having a square cross-section and an outer contour of a receiving region having a rectangular cross-section and a radial play in a radial direction;

FIG. 3c shows an inner contour of a spreading element and an outer contour of a receiving region, each having an oval cross-section and a radial play in a radial direction;

FIG. 3d shows an inner contour of a spreading element having an oval cross-section and an outer contour of a receiving region having a circular cross-section and a radial play in a radial direction;

DETAILED DESCRIPTION

Figure 1:
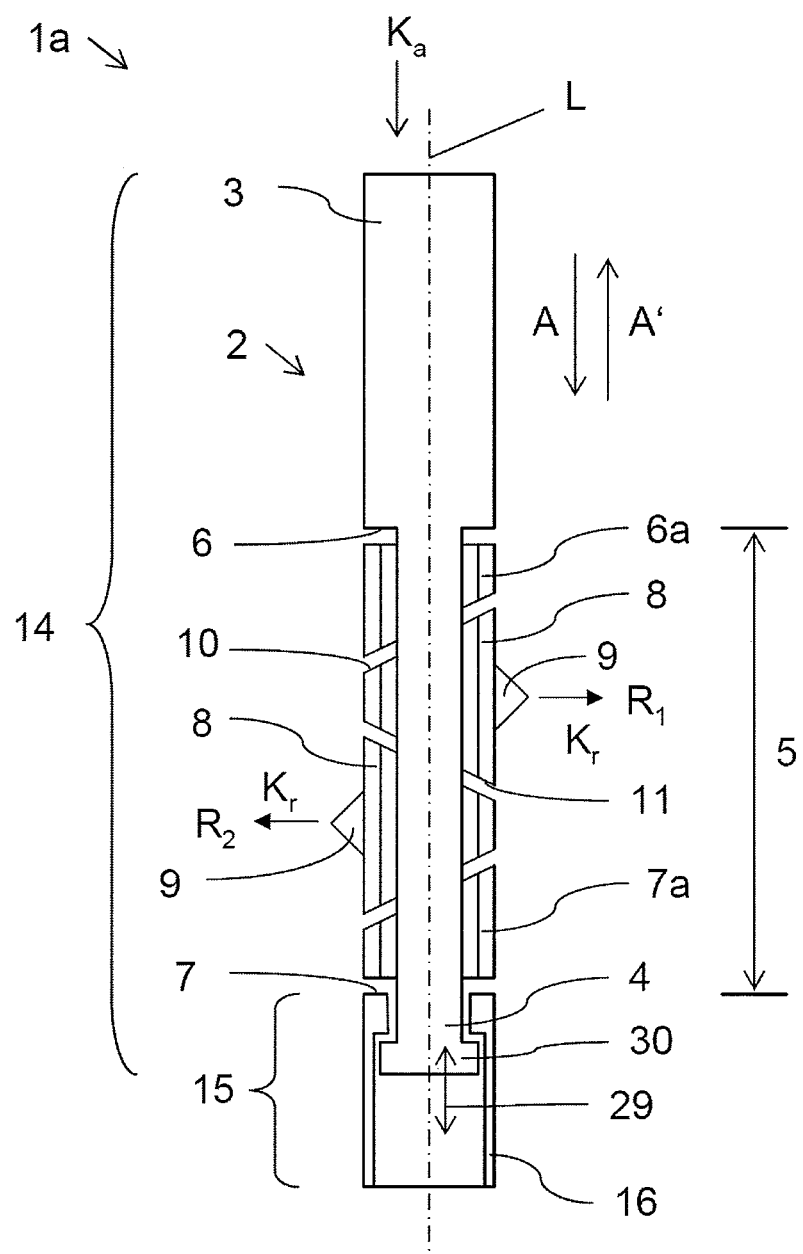
FIG. 1 shows a longitudinal sectional representation of the general structure of an undercutting tool according to the invention for producing transverse grooves in an existing hole, in a first variant.

FIG. 1 shows a schematic longitudinal sectional representation of the general structure of a first variant, according to the invention, of the undercutting tool 1a for producing transverse grooves in an existing hole. The undercutting tool 1a has a geometric longitudinal axis L having an axial direction A and an inverse axial direction A', and comprises a shank 2. This shank 2 has an upper shank end 3, which can be connected in a rotationally fixed manner to a rotatory drive machine, in particular a power drill, for the purpose of causing the shank 2 to rotate about the longitudinal axis L. The rotatory drive machine is not represented in FIG. 1. The upper shank end 3 faces in the inverse axial direction A'. In addition, the shank 2 comprises a lower shank end 4, which is axially opposite the upper shank end 3 and faces in the axial direction A.

Between the upper shank end 3 and the lower shank end 4 there is a receiving region 5 of the shank 2. This receiving region 5, which extends along the longitudinal axis L, is delimited axially by an upper support 6 and a lower support 7. The receiving region 5 of the shank 2 has a lesser diameter than the upper shank end 3. The upper support 6 is constituted by the offset in which the small diameter of the receiving region 5 undergoes a transition into the larger diameter of the upper shank portion 3. The upper support 6 thus delimits the receiving region 5 in the inverse axial direction A', as shown in FIG. 1.

The lower support 7, disposed at the lower shank end 4, is spaced apart axially from the upper support 6 and delimits the receiving region 5 in the axial direction A.

The undercutting tool 1a furthermore comprises at least two spreading elements 8, realized as sleeve-type hollow bodies, which are disposed, distributed in the axial direction, around the shank 2 in the receiving region 5, and which each encompass the receiving region 5. The spreading elements 8 in each case have a radial play in a respective radial direction R1 and R2, relative to the receiving region 5, perpendicularly in relation to the geometric longitudinal axis L. The spreading elements 8 carry cutting teeth 9, which face substantially radially outward in the respective radial direction R1 or R2. These cutting teeth are composed of hard material, in particular of hard metal, high-speed steel, ceramic, sapphire or diamond, or they are realized so as to be integral with the respective spreading element 8.

The undercutting tool 1a is divided into a first movement portion 14 and a second movement portion 15.

According to the first version, shown in FIG. 1, the first movement portion 14 is constituted by the shank 2, its upper shank end 3 and its upper support 6, and by the receiving region 5. The second movement portion 15, on the other hand, comprises the lower support 7 and a lower support sleeve 16. This lower support 7 assigned to the second movement portion 15 is disposed at the lower shank end 4, and can be supported on the bottom of the drilled hole. The second movement portion 15 can thus be coupled axially to the drilled hole in the axial direction A. In other words, when an undercutting tool 1a has been pushed fully into the drilled hole, the second movement portion 15 is axially coupled to the drilled hole in the axial direction A, since the support sleeve 16 stands on the bottom of the drilled hole. The lower shank end 4 can be pushed in the axial direction A, in a telescopic manner, into the support sleeve 16 in such a way that the axial distance between the upper support 6 and the lower support 7 can be reduced by exerting the axial force $K_a$ upon the upper shank end 3 and as a result pushing the lower shank end 4 into the support sleeve 16, and thus also into the lower support 7, which surrounds the shank 2 radially. At its upper end face, the support sleeve 16 has a larger diameter than the receiving region 5. This end face of the lower support sleeve 16, which is opposite the upper support 6, constitutes the lower support 7. This lower support 7 is thus constituted by the offset between the smaller diameter of the receiving region 5 and the larger diameter of the support sleeve 16. As a result of the lower shank end 4 being pushed into the lower support sleeve 16, the first movement portion 14 and the second movement portion 15 are axially displaceable in relation to one another, as shown by the arrow 29 in FIG. 1, such that the axial distance between the upper support 6 and the lower support 7 can be varied. In order to prevent the support sleeve 16 from falling down in the axial direction A, an offset 30 is formed at the lower shank end 4, which offset has an increased diameter, relative to the diameter of the receiving region 5, and which delimits the axial mobility of the support sleeve 16 in the axial direction A. Alternatively, a second variant of the movement portions 14 and 15 is also possible according to the invention, which variant is explained in the following in FIGS. 5a and 5b.

According to the invention, the spreading elements 8 are disposed in the receiving region 5 so as to be secured against rotation and axially displaceable between the upper support 6 and the lower support 7. The axial displaceability of these spreading elements 8, however, is delimited in the inverse axial direction A' by the upper support 6 and in the axial direction A by the lower support 7, in that the supports 6 and 7 constitute a diameter offset. The two spreading elements 8 each have an oblique upper end face 10 that faces in the inverse axial direction A', i.e. upward, and an oblique lower end face 11 that faces in the axial direction A, i.e. downward. The oblique end faces 10 and 11 each have such an outer geometric shape, extending in a direction not perpendicular to the longitudinal axis L, that, as a result of the axial distance between the upper support 6 and the lower support 7 being reduced, respectively adjacent spreading elements 8 are displaced in substantially opposite radial directions $R_1$ and $R_2$ by means of the radial play, the axial force $K_a$ being in each case converted to a radial force $K_r$ in the radial directions $R_1$ and $R_2$ respectively. Provided between the upper support 6 and the upper end face 10 of the uppermost spreading element 8 there is an upper support element 6a, which has an oblique lower end face, corresponding to the oblique upper end face 10 of the spreading element 8, and a straight upper end face that corresponds to the straight end face of the upper support 6. In addition, provided between the lower support 6 and the lower end face 11 of the lowermost spreading element 8 there is a lower support element 7a, which has an oblique upper end face, corresponding to the oblique lower end face 11 of the spreading element 8, and a straight lower end face that corresponds to the straight end face of the lower support 7. In FIG. 1, these support elements 6a and 7a, like the spreading elements 8, likewise have a radial play in relation to the receiving region 5 of the shank 3, but alternatively it is also possible, in general, for these support elements to sit on the receiving region 5 of the shank in an axially displaceable manner without effective radial play.

The functioning principle of the undercutting tool 1a according to the invention is illustrated in a perspective view in FIGS. 2a to 2c. FIG. 2a shows a schematic arrangement of spreading elements in a non-compressed initial position, and FIG. 2b showing a schematic arrangement of spreading elements in a compressed position, a schematic longitudinal sectional representation of a spreading element being shown in FIG. 2c. These figures are described jointly in the following.

FIGS. 2a to 2c show the relative arrangement of the spreading elements 8 in respect of the geometric longitudinal axis L, without the shank 2 and the receiving region 5 surrounded by the spreading elements from FIG. 1. In the example according to FIGS. 2a to 2c, the spreading elements 8 are realized as cylinders that are cut off obliquely on two sides and that, in respect of the geometric longitudinal axis L, have upper and lower end faces 10 and 11, each beveled in substantially opposite directions in relation to one another. In this embodiment, the spreading elements 8, in a longitudinal section along the geometric longitudinal axis L, have a substantially trapezoidal longitudinal section, as shown particularly by FIG. 2c. Under the action of an axially acting force $K_a$ in the axial direction A, the distance between the upper support 6 and the lower support 7, FIG. 1, and between the upper support element 6a and the lower support element 7a is reduced from a value $x_1$ (FIG. 2a) to a value $x_2$ (FIG. 2b). This force $K_a$ acts in a compressive manner upon the spreading elements 8 disposed between the supports 6 and 7. Owing to the shaping of the spreading elements 8, the axial force $K_a$ is in each converted to a radial force $K_r$, by which spreading elements 8 disposed in axial succession, with the respectively two cutting teeth 9 mounted thereon, are forced and displaced in substantially radially opposite directions $R_1$ and $R_2$, as illustrated in FIGS. 2a and 2b. In other words, in each case two adjoining spreading elements 8 are displaced in the opposite radial directions $R_1$ and $R_2$ as a result of the reduction of the distance from $x_1$ from $x_2$, wherein the adjacent spreading elements 8 spread apart relative to each other, i.e. are displaced in opposite radial directions $R_1$ and $R_2$, as shown in FIG. 2b.

Preferably, the upper end face 10 and the lower end face 11 of a spreading element 8 are each beveled by the same angular amount, but in mutually opposite directions in respect of the geometric longitudinal axis L, such that opposing end faces of spreading elements 8 disposed in axial succession constitute mutually contacting, in particular parallel, slide surfaces that are displaceable against each other. This has the advantage that the conversion of axial force $K_a$ to radial force $K_r$ (and also vice-versa, upon decompression upon cessation of the action of an axial force) is effected uniformly for spreading elements 8 disposed in axial succession. In FIG. 2c, the spreading elements 8 are realized as cylinders cut of obliquely on both sides and having a circular outer cross-section. The respective upper end face 10 and the respective lower end face 11 are beveled, in respect of the geometric longitudinal axis L, in substantially opposite directions in relation to one another, the spreading elements 8 having substantially a trapezoidal shape in a geometric longitudinal section along the longitudinal axis L and along a radial direction $R_1$ and $R_2$. The respective cutting teeth 9 are disposed on the broad base 12 of the trapezium, as shown in FIG. 2c. In each case, the outer geometric shape of the oblique end faces 10 and 11, extending in a direction not perpendicular to the longitudinal axis L, is such that the upper end face 10 and the lower end face 11 are each beveled by the same angular amount α, but in mutually opposite directions, in respect of the geometric longitudinal axis L, see FIG. 2c. In the exemplary embodiment shown, this angular amount α, between the longitudinal axis L, which pierces the end faces 10 and 11, and the respective end face 10 or 11 is approximately 68°, but preferably also, in general, can be between 10° and 80°, in particular between 45° and 80°, in particular between 60° and 75°, in particular between 66° and 70°.

FIGS. 3a to 3d show differing cross-sectional geometries of the outer cross-section of the receiving region 5 of the shank 2 and of the inner cross-section of the spreading elements 8. The receiving region 5 surrounded by the sleeve-type spreading elements 8 has a rectangular outer cross-section according to FIG. 3a, a square outer cross-section according to FIG. 3b, an elliptical outer cross-section according to FIG. 3c, and a circular outer cross-section according to FIG. 3d, each having a first outer diameter $D_1$ perpendicularly in relation to the longitudinal axis L, and having a second outer diameter $D_2$ perpendicularly in relation to the longitudinal axis L and perpendicularly in relation to the first outer diameter $D_1$. The spreading elements 8 in each case have a rectangular inner cross-section (FIGS. 3a and 3b) or an elliptical inner cross-section (FIGS. 3c and 3d), the inner cross-sections having a first inner diameter $d_1$ perpendicularly in relation to the longitudinal axis L and parallel to the first outer diameter $D_1$, and having a second inner diameter $d_2$ perpendicularly in relation to the longitudinal axis L, perpendicularly in relation to the first inner diameter $d_1$ and parallel to the second outer diameter $D_2$. The first inner diameter $d_1$ is generally larger than the first outer diameter $D_1$, so as to ensure that the spreading elements 8 can be displaced axially in the receiving region 5, whereas the second inner diameter $d_2$ is significantly larger than the second outer diameter $d_2$, so as to constitute the radial play in the respective radial direction $R_1$ and $R_2$, perpendicularly in relation to the longitudinal axis L, as a result of which the spreading elements 8 can be displaced radially.

Also possible, alternatively, are other outer and inner cross-sectional geometries, or also the combination of differing outer and inner cross-sectional geometries. Thus, it is also possible, in particular, for the receiving region 5 to have an outer cross-section having a circular initial shape having the second outer diameter $D_2$ and a flattened portion on both sides, this flattened portion on both sides resulting in a smaller first outer diameter $D_1$. The same also applies in respect of the inner cross-section of the spreading elements 8.

Figure 4:
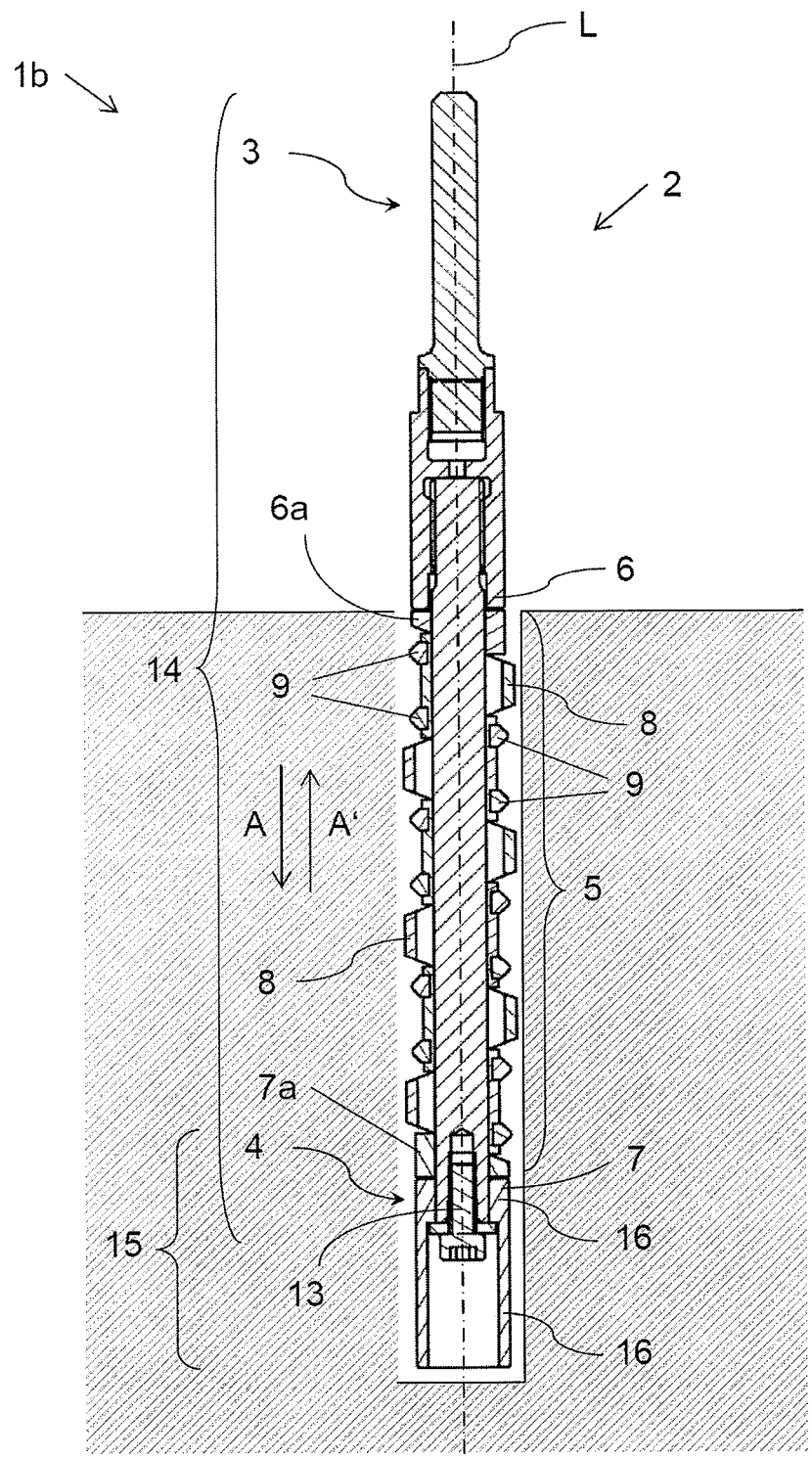
FIG. 4 shows a cross-sectional representation of a first embodiment of an undercutting tool according to the invention, in the first variant.

FIG. 4 shows a first embodiment of an undercutting tool, according to the invention, of the first variant of the invention already explained schematically in FIG. 1. Since the general structure of this embodiment according to FIG. 4 has already been explained in connection with FIG. 1, some of the features and references already explained at the outset are not described in the following.

The undercutting tool 1b shown in FIG. 4 is divided into the first movement portion 14, which comprises the shank 2, with the upper shank end 3 and the lower shank end 4, and the upper support 6 that is coupled axially to the shank 2, and the second movement portion 15, which comprises the lower support 7. The lower support 7 is coupled axially to a lower support sleeve 16. This lower support sleeve 16, which is disposed at the lower shank end 4, is assigned to the second movement portion 15 and can be supported on the bottom of the drilled hole. The second movement portion 15 can therefore be coupled axially to the drilled hole in the axial direction A. The lower support 7 and the lower support sleeve 16 are realized as a single piece, the upward facing end face of the support sleeve 16 constituting the support 7. The lower shank end 4 can be pushed into the support sleeve 16 in the axial direction A in such a way that the axial distance between the upper support 6 and the lower support 7 can be reduced by exerting the axial force $K_a$ upon the upper shank end 3 and pushing the lower shank end 4 into the lower support sleeve 16. The first movement portion 14 and the second movement portion 15 are therefore axially displaceable in relation to one another for the purpose of altering the axial distance between the upper support 6 and the lower support 7. The receiving region 5 of the shank 2 and the upper shank end 3 are connected in a rotationally fixed manner and, together with the upper support 6, are axially displaceable relative to the lower support 7. According to this embodiment, the receiving region 5 of the shank 2 and the upper shank end 3 can be realized so as to constitute multiple pieces, or also a single piece, with each other. The upper support 6 can also be realized so as to constitute a single piece together with the shank 2.

The spreading elements 8, with the cutting teeth 9 connected thereto, are pushed, as onto a chain cord, onto the receiving region 5 of the shank 2 and can be removed from the latter. A fastening mechanism secures the spreading elements 8 against falling down from the receiving region 5 of the shank 2, the fastening mechanism comprising a screw 13 screwed into the lower shank end 4.

Under the action of the axial force $K_a$ upon the upper shank end 3, both movement portions 14 and 15 are pushed together, thereby reducing the axial distance between the upper support element 6a of the upper support 6 and the lower support element 7a of the lower support 7, between which the spreading elements 8 are disposed. Since the spreading elements 8 can be displaced radially, the axial force $K_a$ is converted, as explained at the outset, to a radial force $K_r$, by which the spreading elements 8 are displaced radially outward.

When the upper shank end 3 that is connected to a rotatory drive machine in a rotationally fixed manner is made to rotate and the axial force $K_a$ is exerted in the axial direction A, the spreading elements 8 that are therefore driven radially outward, together with their cutting teeth 9, are pressed into the wall of the drilled hole and produce transverse grooves in the drilled hole.

Figure 5A:
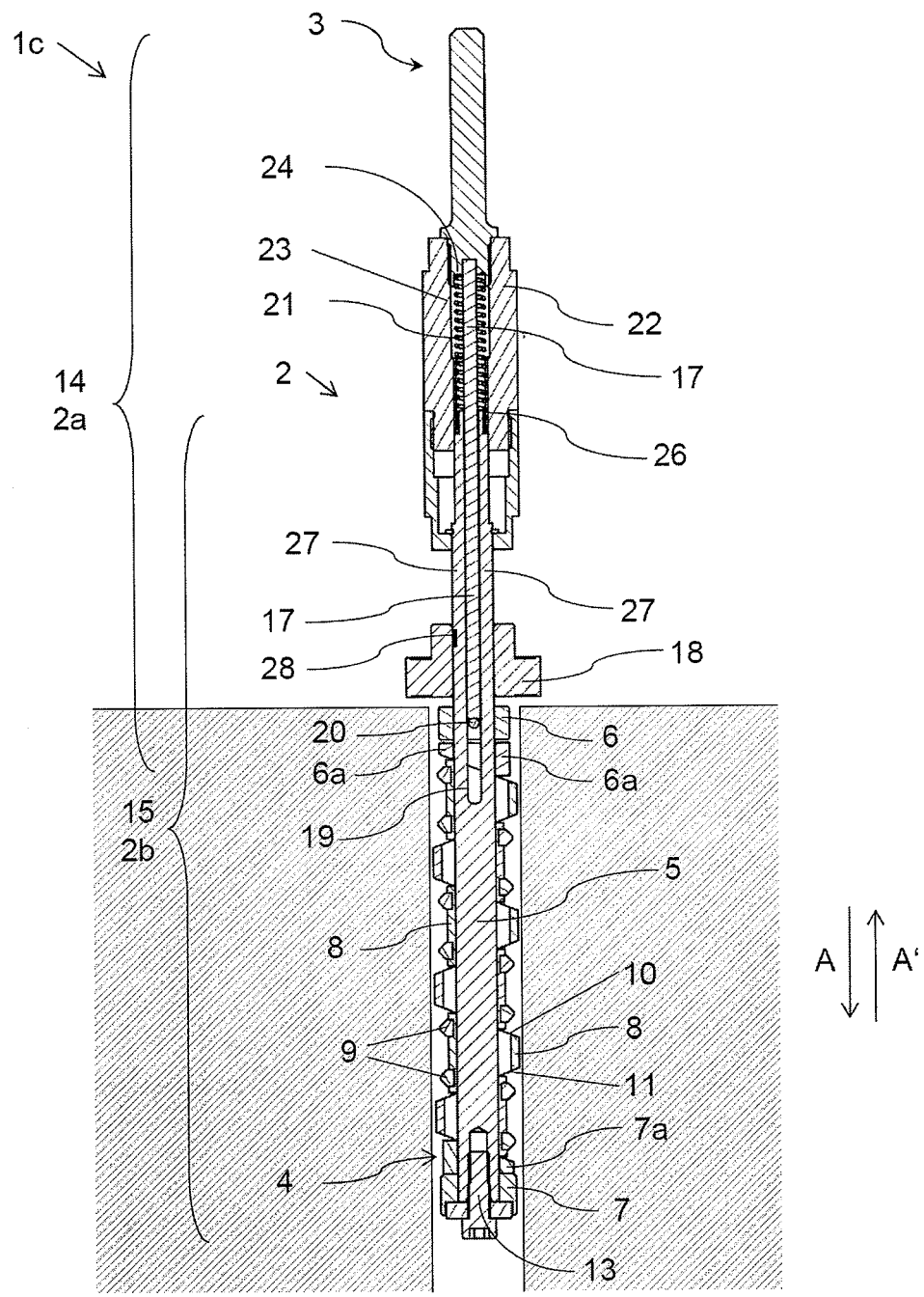
FIG. 5a shows a cross-sectional representation of a second embodiment of an undercutting tool according to the invention, in a second variant.

FIG. 5a shows a cross-sectional representation of a second embodiment of an undercutting tool 1c according to the invention, in the second variant of the invention.

The shank 2 is composed of an upper shank portion 2a and a lower shank portion 2b, which can be pushed into one another in a telescopic manner along the longitudinal axis L. The upper shank portion 2a, with the upper shank end 3 and the upper support 6, constitutes the first movement portion 14. The lower shank portion 2b, on the other hand, with the lower shank end 4 and the lower support 7, constitutes the second movement portion 15. The lower support 7 is fixed axially to the receiving region 5 by means of the screw 7.

The lower shank portion 2b is coupled axially to a support shoulder 18, which is likewise assigned to the second movement portion 15 and which, in a region above the upper support 6, surrounds the lower shank portion 2b radially in such a way that the second movement portion 15, by means of the support shoulder 18, can be supported on a surface surrounding the drilled hole, in order to prevent the second movement portion 15 from being displaced in the axial direction A. A radial ball bearing 28 is provided between the support shoulder 18 and the rest of the lower shank portion 2b, such that the support shoulder 18 is rotationally decoupled from the rest of the undercutting tool 1c and therefore, as the undercutting tool 1c rotates, can lie in a stationary manner on the surface that surrounds the drilled hole. The lower shank end 4, the lower support 7, the receiving region 5 assigned to the second movement portion 15, with the spreading elements 8 surrounding the receiving region, the cutting teeth 9 disposed on the spreading elements, and the upper support 6—as elements disposed beneath the support shoulder 18—can be inserted into the drilled hole, as shown in FIG. 5a. The upper shank portion 2a has a cylindrical, stud-type pin 17 extending along the longitudinal axis L. This pin 17 is mounted so as to be axially displaceable in the shank 2, and goes through the support shoulder 18 for the purpose of axially coupling the upper shank end 3 to the upper support 6. The pin 17 is therefore assigned to the first movement portion 14, i.e. it can be displaced axially together with the upper shank end 3. The spreading elements 9 are coupled to the upper shank end 3 in a rotation-transferring manner, such that a rotation of the upper shank end 3 results in a rotation of the spreading elements 9. This rotational coupling can be effected through corresponding shaping of the inner cross-section of the spreading elements 9 and of the outer cross-section of the receiving region 5, or through the oblique end faces 8 and 9, and a rotational coupling of the upper support element 6a and/or of the lower support element 7a. The lower shank portion 2b is realized so as to be hollow in the region of the support shoulder 18, along the geometric longitudinal axis L. The stud-type pin 17 is guided so as to be axially displaceable inside the lower shank portion 2b. The pin 17 is coupled to the upper support 6 via a slot 19 in the lower shank portion 2b and by means of a transverse bolt 20, which connects the pin 17 to the upper support 6. In other words, the upper support 6 is mounted in an axially displaceable manner on the shank 2 and can be displaced axially together with the upper shank portion 2a, and therefore with the upper shank end 3. An axial displacement of the telescopic shank 2 above the stationary support shoulder 18 is therefore transferred to the region beneath the support shoulder 18. It is therefore possible for the spreading elements 8 inserted into the drilled hole to be compressed axially beneath the support shoulder 18, thereby causing the spreading elements 8 to be forced apart radially for the purpose of producing transverse grooves in the drilled hole.

Figure 5B:
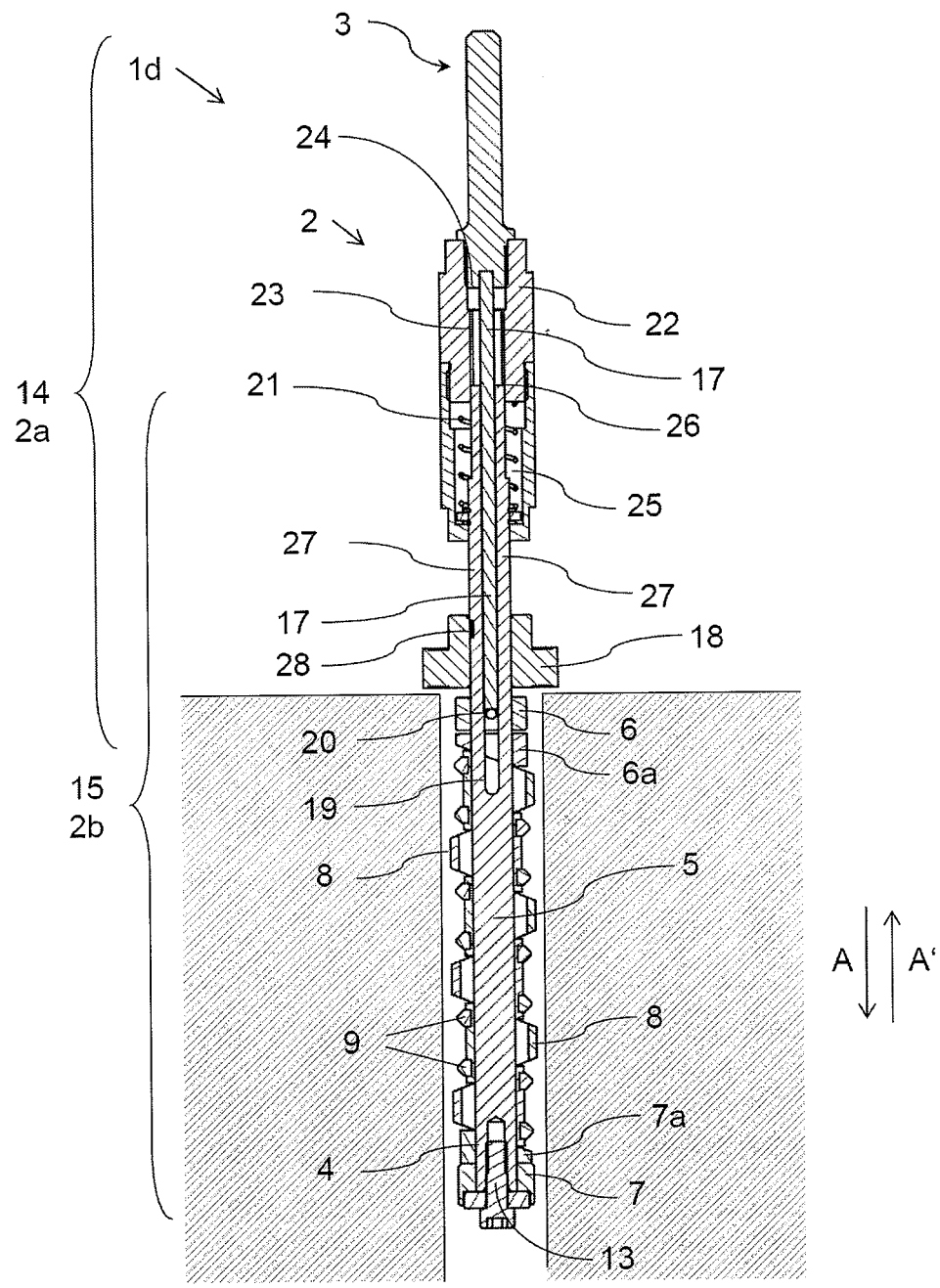
FIG. 5b shows a cross-sectional representation of a third embodiment of an undercutting tool according to the invention, in the second variant.

In other words, the shank 2, in a partial region along the geometric longitudinal axis L, is realized as a hollow body that has a wall 27 extending in the axial direction A and has an upper wall end 26, such that the rod-type pin 17 is inserted in the axial direction A into the region of the shank 2 that is realized as a hollow body. Furthermore, the sleeve-type upper support 6 is assigned to the upper shank portion 2a. This sleeve-type upper support 6 surrounds the lower shank portion 2b and is connected, preferably in a rotationally fixed manner, to the pin 17, for example by means of the transverse bolt, as indicated in FIGS. 5a and 5b. Exerting the axial force $K_a$ upon the upper shank end 3 in the axial direction A causes the upper shank portion 2a, together with the sleeve-type upper support 6, to be displaced, toward the lower support 7, as a result of which the distance between the upper support 6 and the lower support 7 can be reduced.

In addition, preferably, a lower region of the upper shank portion 2a, together with an upper sub-portion of the lower shank portion 2b and the rod-shaped pin 17, are surrounded radially, in a common region along the geometric longitudinal axis L, by a sleeve 22 having a lower sleeve opening. The sleeve 22 in this case constitutes a receiving opening 23, which has an upper closure 24 and in which the wall 27 of the lower shank portion 2b, realized as a hollow body in a partial region along the geometric longitudinal axis L, can engage. Preferably, a force can be generated that opposes the axial force $K_a$ acting in a compressive manner upon the spreading elements 8. The rotatory coupling between the sleeve 22, the upper shank end 3, the wall 27, or pin 17, i.e. between the upper shank portion 2a and the lower shank portion 2b, is effected, for example, by a hexagonal shape of the corresponding elements.

According to the second embodiment of the undercutting tool 1c according to the invention, in the second variant, represented in FIG. 5a, the opposing force can be produced by a spring 21, which is disposed between the upper wall end 26 of the wall 27 of the lower shank portion 2b, which in one region is realized as a hollow body, and the upper closure 24 of the receiving opening 23.

In other words, in a region above the support shoulder 18, the upper shank portion 2a and the lower shank portion 2b can be pushed into one another in a telescopic manner and axially within a sleeve 22, the spring 21 that presses the two shank portions 2a and 2b apart axially being disposed in this sleeve 22. Likewise within this sleeve 22, the pin 17 connects the upper shank end 3 and the upper shank portion 2a axially to the upper support 6.

FIG. 5b shows a cross-sectional representation of a third embodiment of an undercutting tool 1d according to the invention, in the second variant. This third embodiment differs from the second embodiment shown in FIG. 5a only in respect of the structure whereby the upper shank portion 2a and the lower shank portion 2b can be pushed telescopically into one another in the region above the support shoulder 18 mounted by means of the ball bearing 28, for which reason only the differences as compared with FIG. 5a are described in the following and, apart from that, reference is made to the description of the previous figure. According to the embodiment of the undercutting tool 1d according to the invention that is represented in FIG. 5b, the opposing force can be produced by a spring 21 disposed in a radially widened region 25 of the sleeve opening 23. Unlike FIG. 5a, the spring in this case is disposed in a lower region of the sleeve 22. The upper shank portion 2a and the lower shank portion 2b can be pushed into one another in the sleeve 22, in a region above the support shoulder 18, in a telescopic manner and axially within a sleeve 22, the spring 21 that presses the two shank portions 2a and 2b apart axially being disposed in this sleeve 22, and the pin 17 connecting the upper shank end 3 and the upper shank portion 2a axially to the upper support 6.

The undercutting tool 1c or 1d is inserted into the drilled hole until the support shoulder 18 is supported on the surface around the drilled hole, whereby, in turn, a working stop is defined.

Exerting the axial force $K_a$ upon the upper shank portion 2a causes the upper shank portion 2a, together with the upper support 6, to be displaced axially in the axial direction A, towards the lower support 7, as a result of which a compressive force is exerted upon the spreading elements 8 disposed between the supports 6 and 7, and the spreading elements 8 are displaced radially outward. When the upper shank end 3 is connected in a rotationally fixed manner to a rotatory drive machine and is made to rotate, transverse grooves are produced in the drilled hole by the spreading elements 8, driven radially outward, by means of the cutting teeth 9 carried by the latter. After the action of the axial force $K_a$ acting compressively upon the spreading elements 8 has ceased, the return of the spreading elements to their initial position, or neutral position, can be accelerated through action of a counter-force, which counter-force can be produced, for example, through action of the spring 21.

The exemplary embodiments serve merely to explain the invention in a general manner, and the invention is not limited these exemplary embodiments and their feature combinations. A combination of the features of the individual exemplary embodiments and of the feature groups is likewise included in the invention.

The invention claimed is:

1. Undercutting tool for producing transverse grooves in a drilled hole, the undercutting tool having a geometric longitudinal axis having an axial direction and an inverse axial direction, comprising a shank, which has
  an upper shank end connectable in a rotationally fixed manner to a rotatory drive machine for the purpose of causing the shank to rotate about the longitudinal axis, and which faces in the inverse axial direction,
  a lower shank end, which is axially opposite the upper shank end and faces in the axial direction, and
  a receiving region located between the upper shank end and the lower shank end,
an upper support, which delimits the receiving region in the inverse axial direction,
a lower support, which is spaced apart axially from the upper support, delimits the receiving region in the axial direction and, in particular, is disposed at the lower shank end,
at least two spreading elements, realized as sleeve-type hollow bodies, which are disposed in an axially distributed manner in the receiving region, and which each encompass the receiving region, there being in each case, between the spreading elements and the receiving region of the shank, a radial play in a respective radial direction, perpendicularly in relation to the longitudinal axis, and the spreading elements each having at least one cutting tooth facing substantially radially outward in a respective radial direction, wherein the shank is realized in such a way, and the upper support and the lower support are disposed in such a way that the axial distance between the upper support and the lower support is reducible, by exerting an axial force, directed in the axial direction, upon the upper shank end, in particular in a resilient manner, the spreading elements are disposed in the receiving region so as to be secured against rotation and axially displaceable between the upper support and the lower support, the axial displaceability being delimited in the inverse axial direction by the upper support and in the axial direction by the lower support, the spreading elements each have an oblique upper end face that faces in the inverse axial direction, and an oblique lower end face that faces in the axial direction, the oblique end faces each having such an outer geometric shape, extending in a direction not perpendicular to the longitudinal axis, that, as a result of the axial distance between the upper support and the lower support being reduced, respectively adjacent spreading elements are displaced in substantially opposite radial directions by means of the radial play, and the axial force is in each case converted to a radial force in the radial directions, a first movement portion comprising the upper shank end and the upper support and a second movement portion, comprising the lower support, the first movement portion and the second movement portion being axially displaceable in relation to one another for the purpose of varying the axial distance between the upper support and the lower support, and the second movement portion axially coupleable to the drilled hole in the axial direction, and wherein the shank is composed of an upper shank portion and a lower shank portion pushable into one another, in particular in a telescopic manner, along the longitudinal axis, the upper shank portion, with the upper shank end and the upper support, constitutes the first movement portion, and the lower shank portion, with the lower shank end and the lower support, constitutes the second movement portion.

2. Undercutting tool according to claim 1, wherein the spreading elements are realized as cylinders cut off obliquely on both sides, in particular having a circular, oval or polygonal outer cross-section, and the respective upper end face and the respective lower end face are beveled, in respect of the geometric longitudinal axis, in substantially opposite directions in relation to one another, the spreading elements having substantially a trapezoidal shape in a geometric longitudinal section along the longitudinal axis and along a radial direction, and the respectively at least one cutting tooth being disposed on the broad base of the trapezium.

3. Undercutting tool according to claim 2, wherein in each case, the outer geometric shape of the oblique end faces, extending in a direction not perpendicular to the longitudinal axis, is such that the upper end face and the lower end face are each beveled by the same angular amount, but in mutually opposite directions, in respect of the geometric longitudinal axis.

4. Undercutting tool according to claim 3, wherein the angular amount, between the longitudinal axis, which pierces the end faces, and the respective end face is between one of 10° and 80°, 45° and 80°, 60° and 75°, and 66° and 70°.

5. Undercutting tool according to claim 1, wherein
respectively opposing upper and lower end faces of spreading elements disposed in axial succession constitute mutually contacting slide surfaces that are displaceable against each other.

6. Undercutting tool according to claim 1, wherein
the receiving region surrounded by the sleeve-type spreading elements has an, in particular, square, rectangular, polygonal, circular or elliptical outer cross-section, having a first outer diameter perpendicularly in relation to the longitudinal axis, and having a second outer diameter perpendicularly in relation to the longitudinal axis and perpendicularly in relation to the first outer diameter, the spreading elements each have an, in particular, square, rectangular, polygonal, circular or elliptical inner cross-section, having a first inner diameter perpendicularly in relation to the longitudinal axis, and having a second inner diameter perpendicularly in relation to the longitudinal axis and perpendicularly in relation to the first inner diameter, the first inner diameter is larger than the first outer diameter, and the second inner diameter is larger than the second outer diameter, so as to constitute the radial play in the respective radial direction, perpendicularly in relation to the longitudinal axis, which play enables the spreading elements to be displaced radially.

7. Undercutting tool according to claim 6, wherein
the outer cross-section of the receiving region and the cross-section of each of the spreading elements are rectangular.

8. Undercutting tool according to claim 1, wherein the respective at least one cutting tooth is made of one of hardened metal, high-speed steel, ceramic, sapphire, or diamond, or is integral with the respective spreading element.

9. Undercutting tool according to claim 1, wherein
the lower support—which is detachable by being pushed off in the axial direction—is connected in an axially fixed manner to the lower shank end, in particular by means of a screw screwed into the lower shank end, and the spreading elements are pushed onto the receiving region and are removable from the latter, and are secured by the detachable lower support against falling down from the receiving region in the axial direction.

10. Undercutting tool according to claim 1, wherein
the lower shank portion is coupled axially to a support shoulder, which is assigned to the second movement portion and which, in a region above the upper support, surrounds the lower shank portion radially in such a way that the second movement portion, by means of the support shoulder, is supported on a surface surrounding the drilled hole, in order to prevent the second movement portion from being displaced in the axial direction, the lower shank end, the lower support, the receiving region assigned to the second movement portion, with the spreading elements surrounding the receiving region and, in particular, the upper support insertable into the drilled hole, the upper shank portion has a pin, which extends along the longitudinal axis and goes through the support shoulder in an axially displaceable manner for the purpose of axially coupling the upper shank end to the upper support, and which is assigned to the first movement portion, and the spreading elements are coupled to the upper shank end in a rotation—transferring manner.

11. Undercutting tool according to claim 10, wherein the lower shank portion is realized so as to be hollow, at least in the region of the support shoulder, along the geometric longitudinal axis, the pin is guided so as to be axially displaceable inside the lower shank portion, and the pin is coupled to the upper support via a slot in the lower shank portion and, in particular, by means of a transverse bolt, which connects the pin to the upper support.

12. Undercutting tool according to claim 1, wherein disposed between the first movement portion and the second movement portion, in particular between the upper shank portion and the lower shank portion, there is an axially acting spring, which opposes the axial force directed in the axial direction onto the upper shank end, and which presses the movement portions into an initial position, in which the axial distance between the upper support and the lower support is maximal.

\* \* \* \* \*